United States Patent Office 3,810,962
Patented May 14, 1974

3,810,962
METHOD OF MAKING A CARBIDE-GRAPHITE COMPOSITE NUCLEAR FUEL
William W. Martin, Donald H. Schell, and James M. Taub, Los Alamos, N. Mex., assignors to the United States of America as represented by the United States Atomic Energy Commission
Filed Aug. 25, 1972, Ser. No. 282,745
Int. Cl. G21c 21/00
U.S. Cl. 264—.5           3 Claims

ABSTRACT OF THE DISCLOSURE

Composite nuclear fuel materials of the formula (U,Zr)C—C in which the ratio of U to Zr can be varied over rather wide ranges without significantly altering physical characteristics, as long as the overall carbide content is held constant. Optimum characteristics for fuel elements useful in nuclear propulsion reactors are exhibited by the composites containing 30 to 35 vol. percent carbide. Fuel elements of these composites are readily made by blending ZrC powder, $UO_2$ powder, graphite flour, carbon black, and a thermosetting resin in the appropriate ratios to provide the desired final product, extruding in a desired shape, curing, and subjecting the cured extrusion to a high-temperature heat treatment.

BACKGROUND OF THE INVENTION

The invention described herein was made in the course of, or under, a contract with the U.S. Atomic Energy Commission. It relates to a nuclear reactor fuel material and a method of making same and more particularly to a composite of graphite and a solid solution of UC and ZrC.

It is highly desirable that fuels useful in nuclear propulsion systems be capable of providing the hottest possible operating environment consistent with retention of structural integrity of the fuel elements. Retention of structural integrity depends on the resistance of the fuel material to thermal stress and its capability of being protected against the corrosive effects of hot flowing hydrogen. The resistance to thermal stress is related to strength, Young's modulus, thermal conductivity, and the influence of the coefficient of thermal expansion.

Pyrolytic-carbon-coated $UC_2$ fuel particles interspersed in a graphite matrix are known in the art as having use in nuclear propulsion reactors. Fuel elements composed of this material and coated with niobium carbide saw use in Phoebus-type Rover reactors. They have two substantial disadvantages, however. They are limited to long-term operation (i.e., in excess of 30 minutes) at temperatures less than 2500°C., and they are susceptible to hydrogen corrosion, even though coated with NbC.

SUMMARY OF THE INVENTION

We have now found that a carbide-graphite composite nuclear fuel material of the general formula (U,Zr)C—C is advantageous for use in nuclear propulsion reactors operating at temperatures in excess of 2500° C. As long as the overall carbide content is held constant, the ratio of uranium to zirconium may be varied rather widely without significantly affecting the physical characteristics of the material. This allows power levels within the reactor core to be varied substantially at different locations without altering the physical characteristics of the fuel elements. Optimum characteristics for fuel elements useful in nuclear propulsion reactors are exhibited by the composites containing 30 to 35 vol. percent carbide.

Fuel elements of these composites are readily made by (1) mixing dry ingredients consisting of reactor grade, high density, nonporous ZrC powder, $UO_2$ powder, graphite flour, and carbon black in the desired quantity and ratio to provide the desired final product, (2) blending with a thermosetting resin, e.g., partially polymerized furfuryl alcohol, which acts as a binder, (3) extruding to a desired shape, (4) curing, and (5) submitting the cured extrusion to a high-temperature heat treatment.

DESCRIPTION OF THE PREFERRED EMBODIMENTS

The ratio of carbide to graphite in the (U,Zr)C—C composites of this invention is determined by the following considerations. If the carbide content is too high, the material is sensitive to thermal stress. If the carbide content is too low, the corrosion resistance of the fuel element is lost in that a satisfactory carbide structure will not be maintained if the free carbon is removed as a result of attack by hot flowing hydrogen. Composite fuels of this type therefore represent a tradeoff between these two considerations.

Neutronically, the addition of ZrC in the reactor core replaces a moderating atom, C, with the relatively non-moderating Zr which has neutron capture resonances in the keV. energy range. This results in a hardening of the neutron spectrum and a decrease in reactivity. As the Zr/C ratio in the core increases, the U loading must also increase to maintain criticality. High U loadings impose an upper limit on the operating temperature of the reactor because with sufficiently high U loadings a eutectic is reached at about 2410° C. (see FIG. 1). Aside from this fact, as long as the carbide content is held constant, the ratio of U to Zr can be varied over rather wide ranges without significantly altering physical characteristics.

At appropriate ratios of carbide to graphite and the use of a graphite having a high coefficient of thermal expansion, the coefficient of expansion of the composite is very similar to that of pure ZrC. Since pure ZrC is highly resistant to hydrogen corrosion, this allows a very adherent coating of ZrC to be deposited on the fuel to protect it against corrosion of this type.

Figure 1:
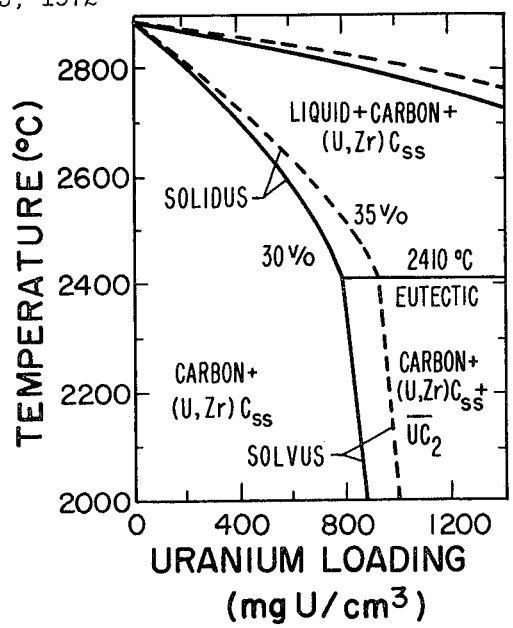
FIG. 1 is a portion of a "pseudobinary" phase diagram of the composite fuel material of this invention containing 30 and 35 vol. percent carbide.

With these considerations in mind, optimum characteristics for fuel elements useful in nuclear propulsion reactors are exhibited by the composites containing between 30 and 35 vol. percent carbide. At these ratios of carbide to graphite, there is sufficient carbide to provide a carbide matrix in the elements so that even should the ZrC coating fail and the free carbon be lost as a result of hydrogen attack the elements will retain structural integrity for a period of time. There is also a continuous graphite structure. The "pseudobinary" phase diagram of FIG. 1 shows the phase equilibria in the carbon-rich portion of the ternary U—Zr—C system as a vertical section passing through the ZrC—C and the $UC_2$—C eutectic points. The solidus, eutectic, and solvus lines intersect at about 780 mg. U/cm.$^3$ for 30 vol. percent carbide and at about 920 mg. U/cm.$^3$ for 35 vol. percent carbide. This difference indicates that 35 vol. percent carbide composite fuel elements can have uranium loadings 100 to 150 mg./cm.$^3$ higher than 30 vol. percent carbide elements before appreciable quantities of residual $\overline{UC_2}$ are found. As used in FIG. 1, (U,Zr)C$_{ss}$ refers to a solid solution of UC and ZrC and $\overline{UC_2}$ denotes $UC_2$ containing some zirconium in solution.

The solid solution carbide-graphite composites of this invention can be prepared in situ through chemical reaction in an extruded desired shape according to the following process. Dry ingredients consisting of reactor grade, high density, nonporous ZrC powder, $UO_2$ powder, graphite flour, and carbon black are weighed and mixed in the appropriate ratios to provide the desired final product. The mixed dry ingredients are then blended with a thermosetting resin which acts as a binder. The preferred resin for this purpose is a partially polymerized furfuryl alcohol catalyzed with 4 g. maleic anhydride per 100 cm.$^3$ of resin. The viscosity of the composite mix is controlled by the binder content. After blending, the mix is extruded, with the extrusion pressure being controlled both by the viscosity of the mix and the extrusion speed. It is necessary to pull a vacuum of less than 1 mm. Hg on the mix prior to extrusion; otherwise the cured extrusions contain blisters, spalls, or other flaws. The extrusions are then subjected to curing, pyrolysis, and sintering and graphitization heat-treatment cycles.

As used within this application, "curing" refers to a heat treatment by which thermosetting resins undergo polymerization and cross linking and are transformed from liquids to solids. "Pyrolysis" is a heat treatment in which a cured resin is heated to well above its decomposition temperature, nearly all volatile components and volatile decomposition products are driven off, and a carbon matrix is produced.

Figure 2:
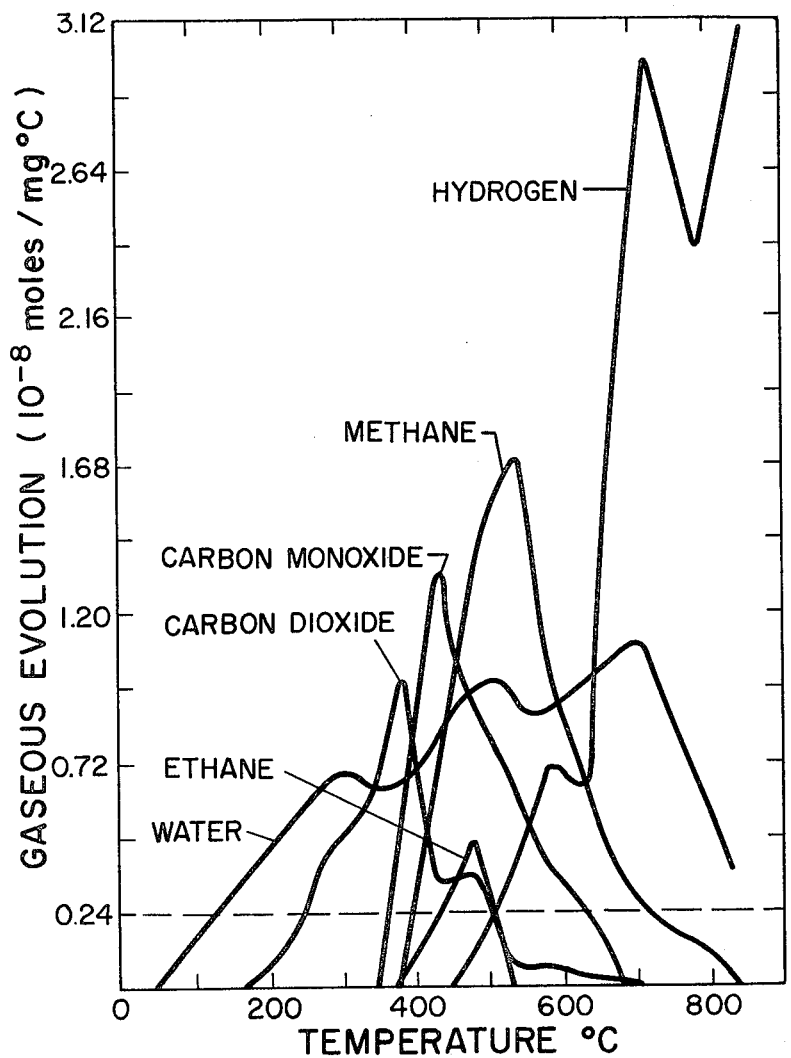
FIG. 2 shows the types and amounts of gases evolved during curing and pyrolysis of a partially polymerized furfuryl alcohol.
Figure 3:
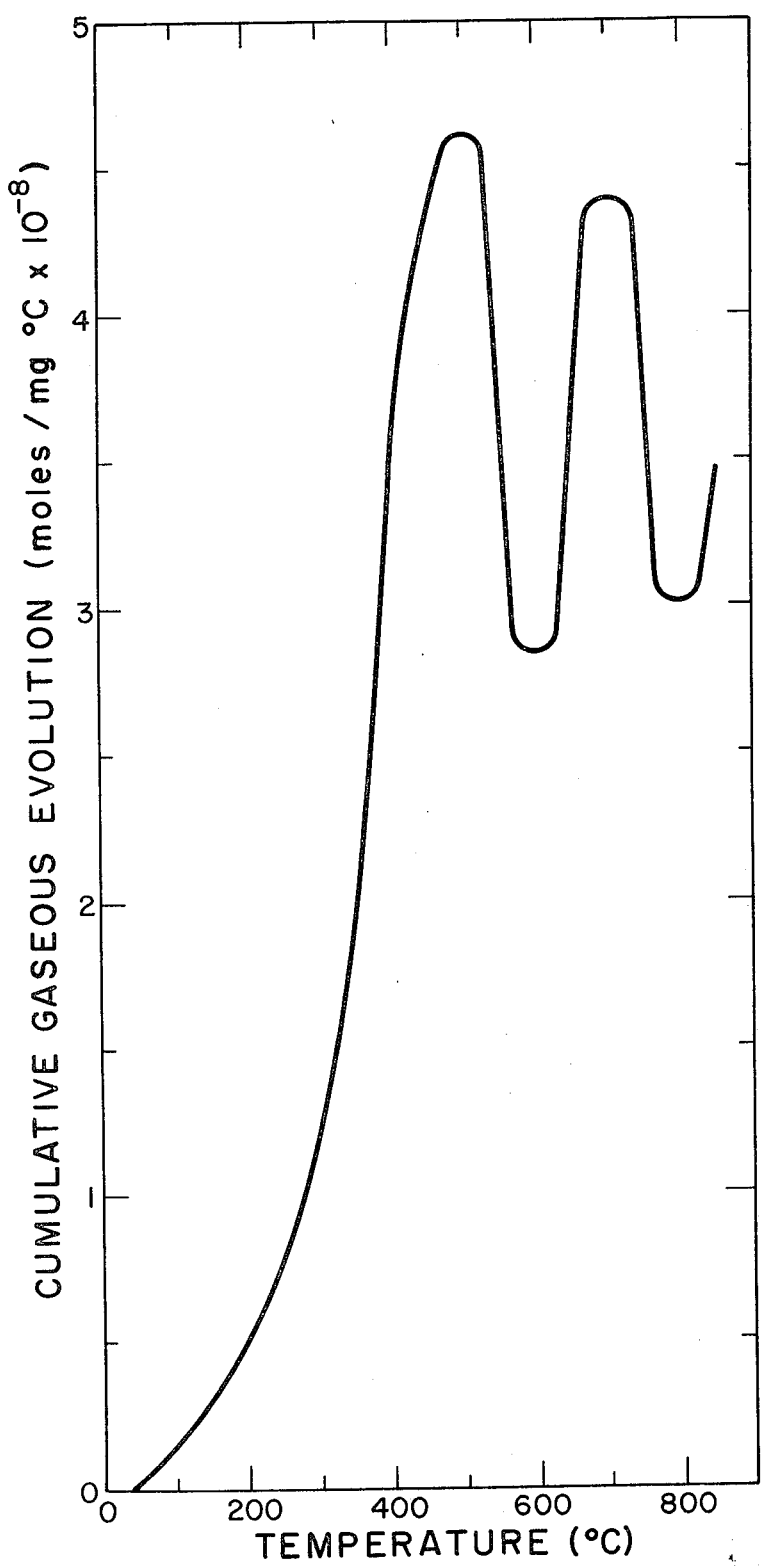
FIG. 3 shows the cumulative amount of gases evolved at various temperatures during curing and pyrolysis of a partially polymerized furfuryl alcohol.

The temperatures and times involved in the various heat-treatment cycles are determined by the chemical and physical effects sought to be achieved within the extrusions. FIGS. 2 and 3 indicate the types and quantities of gases evolved during the curing and pyrolysis heat treatments of a partially polymerized furfuryl alcohol. Gaseous evolution plays a significant role in determining the proper heat treatment cycles, since it is apparent that too rapid evolution of gas will disadvantageously affect the structural integrity of the extrusions. Pyrolysis is substantially completed after a period of time at 850° C.; however, additional gas evolution begins to occur at about 1600° C. when the reaction

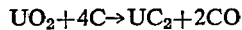

$$UO_2 + 4C \rightarrow UC_2 + 2CO$$

takes place. The temperature is then raised to 2350° C. and held for a time sufficient to ensure that all $UC_2$ has gone into solid solution with ZrC. The purpose of this is to avoid the presence of any free $UC_2$ as the temperature approaches the eutectic temperature (2410° C.). The extrusions are then heated to the solidus temperature or slightly above to sinter them and improve their thermal stress resistance. Heating to the solidus temperature, which varies depending on the uranium content (see FIG. 1), also serves to ensure that the fuel elements will have seen a maximum temperature well over their operating temperatures before ever being inserted into the reactor core. This high-temperature heat treatment thus serves to minimize any structural instabilities that might otherwise tend to occur during reactor operation. It will be apparent to one of ordinary skill in the art that this total heat treatment serves not only to form the solid solution (U,Zr)C—C composite and sinter it, but also to reorganize the free carbon that is present.

For extrusions using furfuryl alcohol resins as binders, a typical curing cycle consists of heating to 250° C. over a period of 63 hours. After heating to 250°, the extrusions are heated to 850° C. over a 117-hour period in a soft vacuum (10 Torr or less) using a He or Ar flush through the extrusions. The first high temperature heat treatment comprises raising the temperature of the extrusions to 1600° C. over a 2.5 hour period, allowing the temperature to drift up to 2350° C. over a 3-hour period and holding for 2 to 6 hours at 2350° C. The final heat treatment comprises heating to temperature over a 6 to 8 hour period and holding for 2 hours. The final heat treating temperature is dependent on the uranium content of the carbide phase and may be as high as 2800° C.

It will be understood that the particular heat treating cycles used are not to be limited to that given by example herein but rather are determined by the physical and chemical effects sought to be achieved. The cycles need not be separated but can readily be accomplished in one continuous heat treatment if so desired. Further, the term "uranium" as used within this specification refers to enriched uranium.

In an example of the process of this invention, 2078 g. of graphite flour, 5064 g. of reactor grade ZrC powder, and 1068 g. of $UO_2$ powder were mixed and then blended with 1145 g. of Varcum 8251 (a partially polymerized furfuryl alcohol resin) containing 4 g. of maleic anhydride per 100 g. of resin. The mix was then extruded to desired shapes and the extrusions cured, pyrolyzed and otherwise heat treated in accordance with the typical process disclosed herein. The resultant fuel elements consisted of a (U,Zr)C—C composite containing 35 vol. percent (U,Zr)C and having a uranium loading of 40 mg./cm.$^3$.

In another example of the process of this invention, 2054 g. of graphite flour, 3804 g. of reactor grade ZrC powder, and 2112 g. of $UO_2$ powder were mixed and then blended with 1113 g. of Varcum 8251 containing 4 g. of maleic anhydride per 100 g. of resin. The mix was then extruded to desired shapes and the extrusions cured, pyrolyzed, and otherwise heat treated in accordance with the typical process disclosed herein. The resultant fuel elements consisted of a (U,Zr)C—C composite containign 30 vol. percent (U,Zr)C and having a uranium loading of 800 mg. /cm.$^3$.

What we claim is:

1. A method of producing in situ in a desired extruded shape a (U,Zr)C—C composite nuclear fuel which comprises
   (a) mixing powders of ZrC, $UO_2$, and carbon,
   (b) blending the mixed powders with a suitable binder material and catalyst,
   (c) extruding,
   (d) curing,
   (e) pyrolyzing, and
   (f) subjecting the pyrolyzed extrusion to a first sintering heat treatment, said first sintering heat treatment being at a temperature of 2350° C. and for a time sufficient that all $UO_2$ present is converted to $UC_2$ and all $UC_2$ forms a solid solution with ZrC, a second sintering heat treatment, said second sintering heat treatment being to a temperature at or slightly above the solidus for the uranium content of said extrusion.

2. The method of claim 1 wherein said binder material is partially polymerized furfuryl alcohol.

3. The method of claim 1 wherein said carbon powder is selected from the class consisting of graphite flour, carbon black, and a mixture thereof.

References Cited

UNITED STATES PATENTS

| | | | |
|---|---|---|---|
| 3,207,697 | 9/1965 | Benesovsky et al. | 264—0.5 |
| 3,293,332 | 12/1966 | Ingleby | 264—0.5 |
| 3,376,231 | 4/1968 | Beucherie et al. | 252—301.1 R |
| 3,284,550 | 11/1966 | Riley et al. | 264—0.5 |
| 3,031,389 | 4/1962 | Geoddel et al. | 252—301.1 R |
| 3,264,222 | 8/1966 | Carpenter et al. | 252—301.1 R |

BENJAMIN R. PADGETT, Primary Examiner

B. HUNT, Assistant Examiner

U.S. Cl. X.R.

252—301.1 R